ELECTRONIC CONTROL DEVICE COMPOSED OF PHOTOCONDUCTING INSULATORS

Filed April 2, 1964

INVENTORS
SHELDON D. SOFTKY
SAMUEL I. TAIMUTY
SYLVAN RUBIN
BY Samuel Lindenberg
ATTORNEY United States Patent Office 3,475,610

Patented Oct. 28, 1969

3,475,610

ELECTRONIC CONTROL DEVICE COMPOSED OF PHOTOCONDUCTING INSULATORS

Sheldon D. Softky, Menlo Park, Samuel I. Taimuty, Palo Alto, and Sylvan Rubin, Los Altos Hills, Calif., assignors to Stanford Research Institute, Menlo Park, Calif., a corporation of California Filed Apr. 2, 1964, Ser. No. 356,709
Int. Cl. H01j 39/12
U.S. Cl. 250—211 13 Claims

ABSTRACT OF THE DISCLOSURE

Adjacent layers of photoconductive insulator material having thereon metal layers with different work functions are exposed to radiation to provide a solid state control device.

This invention relates to electronic control devices and more particularly to improvements therein.

An object of this invention is to provide a novel and useful device for controlling electrical energy.

Yet another object of the present invention is to provide a novel solid state control device.

Still another object of the present invention is the provision of a novel solid state control device which need not use a voltage supply for the operation thereof.

Yet another object of the present invention is the provision of a high impedance solid state control device.

These and other objects of the invention may be achieved by a device which may comprise alternating or adjacent layers of p-type and n-type photoconductive insulator material. The structure may be connected across a load. Upon irradiation of the photoconductive insulators, either by light of the proper frequency or by any other type of ionizing radiation, a flow of current occurs thus establishing a voltage across the load. This current flow may be modulated by the insertion of a grid region between the layers of photoconductive insulating material. A modulating signal may then be applied to this grid.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

A given insulating material can be made electrically conducting by irradiation with light of the proper frequency or by irradiation with ionizing radiation. Analogous to the operation of doped semiconductor material, each such insulating material owes its photoconduction to a majority carrier which is characteristic of the insulator; i.e., some insulators are p-type when photoconducting (the majority carriers are holes), others are n-type (the majority carriers are electrons). Examples of photoconducting insulators, whose conduction is due primarily to electrons, hence are of the "n-type," are barium oxides, silicon dioxide, or organic polymers. Some examples of photoconducting insulators whose conduction is due primarily to holes, hence are of the "p-type," are magnesium oxide, and gallium phosphide.

Figure 1:
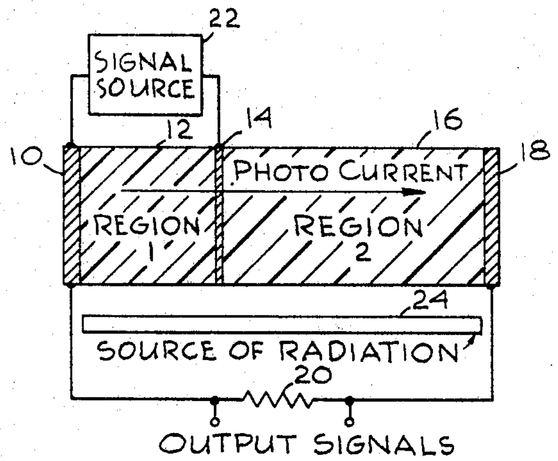
FIGURE 1 is an end view of one embodiment of the invention.
Figure 2:
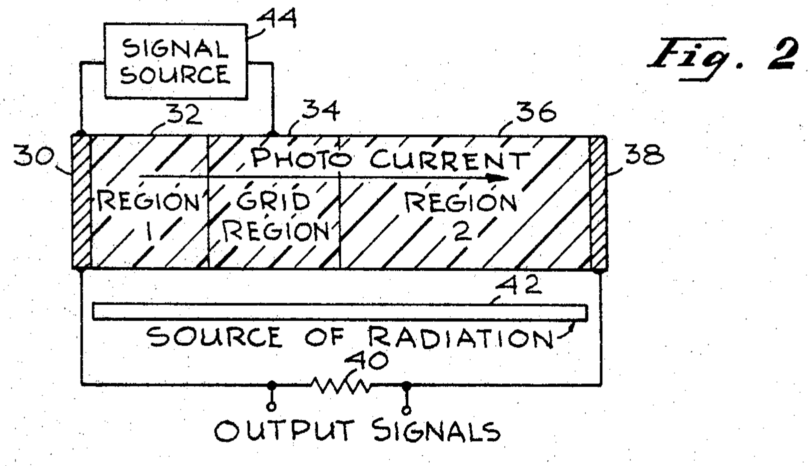
FIGURE 2 is an end view of the second embodiment of the invention.

Reference is now made to FIGURE 1 which is an end view of an embodiment of the invention. Effectively, as may be seen in FIGURE 1, the embodiment of the invention comprises layers of different materials. These layers may be flat, curved, or may be made to assume any other desired geometric shape, such as a concentric disposition of the various layers. Thus, the forms of the embodiment of the invention shown in FIGURES 1 and 2 are illustrative and should not be construed as a limitation thereon.

In FIGURE 1, the embodiment of the invention comprises a first metal layer 10 which may be deposited upon a layer of photoconductive insulating material 12 which is designated as region 1. A grid layer 14 is deposited upon the surface of region 1 opposite to that upon which the metal layer 10 is deposited. The grid layer 14 is a thin metal layer which is made thin enough to allow diffusion of photocurrent carriers through it. It may be made of the same metal as the layer 10. The second layer 16 of photoconductive insulating material is deposited on the grid layer 14. A metal layer 18 is deposited on the surface of the photoconductive insulating layer 16, or region 2, which is opposite to the one adjacent to the grid layer 14. A work load 20 is connected between the two metal layers 10, 18. A signal source 22 is connected between the grid and the metal layer 10.

The metal layer 10 may be considered as analogous to the cathode of a control device and is preferably made of a metal having a low work function. An example of such metal may be aluminum. The metal layer 18 is analogous to the anode of a control device and preferably is a metal having a high work function. An example of a high work function metal suitable for the purpose indicated is gold. The function of the metal layers 10 and 18 is to establish an electric field through the photoconductive insulators in response to the contact potential difference of the two metal layers. The embodiment of the invention will also operate therefore if the field is reversed by making the metal layer 10 a metal having a high work function, metal layer 18 a metal having a low work function, and metal grid 14, metal similar to metal layer 10.

The region 1 photoconductor which is the control region for the device shown, may be a photoconducting insulator of the n-type (or p-type). Region 2 is a photoconducting insulator of the same conductivity type as region 1.

A high energy radiation source 24 is permitted to irradiate the photoconductive regions respectively 1 and 2. This creates holes or electrons depending upon the photoconductive insulating material which is employed. Under the influence of the electric field established by the contact potential difference of the two metal layers, a flow of electrons in one direction with a consequent flow of holes in the opposite direction occurs in the material. Thereby, a photocurrent is made to flow which effectively causes electrical current to flow through the load 20 and an output may be derived thereacross. When the signal voltage from the signal source is made positive with respect to the potential of the conduction band of the material in region 1 of the invenion, there is a constant electric field through the device, and it will function as a simple bulk photovoltaic cell delivering its photocurrent to the load resistance. However, when the signal source goes more negative than the potential of the conduction band of the material in region 1, then the electric field in the control region is less favorable to the flow of the photocurrent. In this manner by varying about the conduction band voltage, the signal source may modulate the photocurrent. The source of radiation may be external to the photoconductive material which is employed, as shown, or may be provided by incorporating into the photoconductive material radioactive material, where such radioactive material can produce ionization of the photoconductive material.

It should be noted that the control region 2, all by itself, is a load for the signal source, and so the photocurrent circulating in the grid circuit must be small relative to the total device load current. This will be so, if the signal source impedance is larger than the plate load. The effective resistance of the control region is determined by the effect of the electric field which exists there upon current flow. By way of example, the thickness of the control layer should be on the order of, or greater than 1,000 angstroms. The power generating region should be made thicker than the control region and is on the order of, or greater than, 10,000 angstroms.

FIGURE 2 is an edge view of another embodiment of the invention. Here, a first metal layer 30, which is the analog of an emitter of a transistor, is a low work function metal, such as aluminum. This metal layer is deposited on one surface of a layer of photoconductive material 32. The layer of photoconductive material 32 is known as region 1. A grid region 34 of photoconductive material is deposited on region 1. The grid region is made sufficiently thin to allow diffusion of the photocurrent carriers to pass therethrough. On the opposite surface of the grid region 34 another layer of photoconductive material 36 is deposited. On the opposite surface of the photoconductive layer 36 there is deposited another metal layer 38. This metal layer is the analog of a collector in a transistor and is preferably a high work function metal, such as gold.

Region 1 in this embodiment of the invention also constitutes a control region and region 2, a power generating region. Regions 1 and 2 are photoconductive insulating materials of the same types (both n or both p). The grid region 34 is analogous to the base of a junction transistor, and consists of photoconductive insulating material of an opposite conduction type from regions 1 and 2. The thickness of regions 1 and 2 are on the same order as those recited for FIGURE 1. The thickness of the grid region is determined by the material used with the requirement that it be sufficiently thin to allow diffusion of the photocurrent carriers to pass therethrough.

A load 40 may be connected between the metal layers 30 and 38. A source of ionizing radiation 42 is permitted to irradiate the photoconductive material.

Here the signal source 44, which is connected between the grid region and the metal layer 30, operates to modulate the photocurrent by varying the potential of the grid region with respect to the conduction band potential of the control region 1. In this device, the input impedance is not necessarily higher than the output impedance, but the principle of current control is the same, a modulation of the field in the control region, causing a modulation of the output of the device which functions as a bulk photovoltaic cell due to its being in a radiation field.

Figure 3:
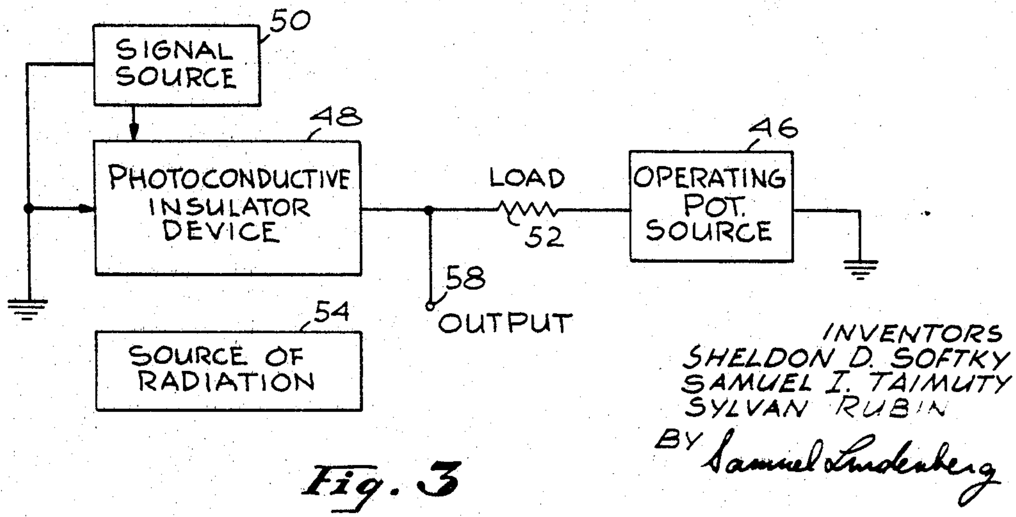
FIGURE 3 is a block diagram of an embodiment of the invention which may be used for delivering power.

While the embodiments of the invention described above are self energizing devices, when power is desired an external source of operating potential may be employed. This is shown in FIGURE 3. With this embodiment of the invention, the anode and cathode metal layers need not be of dissimilar metals since the field that causes the electron-hole flow is provided by the operating potential source. Furthermore, the device is bipolar, that is, it will operate with either polarity of the operating potential source 46.

The rectangle 48, which bears the legend "photoconductive insulator device" may be either the device shown in FIGURE 1 or FIGURE 2, exclusive of the loads. The signal source 50 corresponds to either of the signal sources 22, 44. The load 52 connects the operating potential source to the photoconductive insulator device. A source of radiation 54 irradiates the photoconductive insulator device in the manner previously described. The signal source 50 modulates the current flowing through the device and an output is derived from the terminal 58 and ground.

There has accordingly been described and shown herein a novel and useful high impedence electrical control device.

What is claimed is:

1. A control device comprising a control layer of photoconductive insulating material, a power layer of photoconductive insulating material, means between said power layer and control layer for controlling the electric field in said control layer, a first metal layer in contact with a surface of said control layer, a second metal layer in contact with a surface of said power layer, and means for irradiating said layers of photoconductive insulating material to cause ionization thereof said metal layers having different work functions.

2. A control device as recited in claim 1 wherein said control layer and said power layer are made of p-type photoconductive insulating material and said means for establishing the field within said control layer comprises a layer of metal having a thickness which permits the diffusion of photocurrent carriers therethrough.

3. A control device as recited in claim 2 wherein said p-type photoconductive insulating material consists of one of magnesium oxide and gallium phosphide.

4. A control device as recited in claim 1 wherein said control layer and said power layers are made of n-type photoconductive insulating material and said means for controlling the field within said control layer comprises a layer of metal having a thickness which permits the diffusion of photocarriers therethrough.

5. A control device as recited in claim 4 wherein said n-type photoconductive insulating material consists of one of barium oxide and silicon dioxide.

6. A control device comprising a control layer of photoconductive insulating material, a power layer of photoconductive insulating material, said control layer and power layer being separated by a grid layer comprising a layer of metal thin enough to allow diffusion of photocurrent carriers therethrough, a metal layer having one work function deposited on one external surface of said control layer, a metal layer having another work function deposited on an external surface of said power layer, a source of modulating signals connected between said metal layer having one work function and said grid layer, a load connected between said one and another work function metal layers, and means for causing ionization within said control and power layers.

7. A control device as recited in claim 6 wherein said means for controlling the field within said control layer comprises a layer of photoconductive insulating material which is one of a p or n type, and the type of photoconductive insulating material comprising said control layer and power layer is the other of the p or n type than said means for controlling the field.

8. An electrical control device comprising a control layer of photoconductive insulating material, a power layer of photoconductive insulating material, said control layer and power layer abutting on opposite surfaces of a grid layer of photoconductive insulating material, said control and power layers being one of a p or n type of material and said grid layer being of the other of said p or n types of material, a first layer of metal deposited on an outside surface of said control layer of material, a second layer of metal deposited upon an outside surface of said power generating layer of material, and means for causing ionization to occur within all of said layers of photoconductive insulating material, said metal layers having different work functions.

9. An electrical control device as recited in claim 8 wherein said first layer of metal has a work function which is low compared to the work function of said second layer of metal.

10. An electrical control device as recited in claim 8 wherein said first layer of metal has a work function which is high relative to the work function of said second metal layer.

11. A control device as recited in claim 8 wherein there is included a source of modulating signals connected between said grid layer and said first metal layer, and a load connected between said first metal layer and said second metal layer.

12. A control device comprising a control layer of photoconductive insulating material, a power layer of photoconductive insulating material, said control layer and power layer being separated by a grid layer comprising a layer of metal thin enough to allow diffusion of photocurrent carriers therethrough, a metal layer having one work function deposited on one external surface of said control layer, a metal layer having another work function deposited on an external surface of said power layer, a source of modulating signals connected between said metal layer having one work function and said grid layer, a load connected between said one and another work function metal layers, a source of operating potential, and means including a load connecting said source of operating potential to said control device.

13. An electrical control device comprising a control layer of photoconductive insulating material, a power layer of photoconductive insulating material, said control layer and power layer abutting on opposite surfaces of a grid layer of photoconductive insulating material, said control and power layers being one of a p or n type of material and said grid layer being of the other of said p or n types of material, a first layer of metal deposited on an outside surface of said control layer of material, a second layer of metal deposited upon an outside surface of said power generating layer of material, a source of operating potential, and means including a load connecting said source of operating potential to said control device, said metal layers having different work functions.

References Cited

UNITED STATES PATENTS

| | | | |
|---|---|---|---|
| 2,406,139 | 8/1946 | Fink et al. | 250—212 X |
| 2,743,430 | 4/1956 | Schultz et al. | 250—212 X |
| 2,794,863 | 6/1957 | Van Roosbroeck. | |
| 3,121,795 | 2/1964 | Marvin | 250—212 |

WALTER STOLWEIN, Primary Examiner

U.S. Cl. X.R.

317—235